Patented Feb. 13, 1940

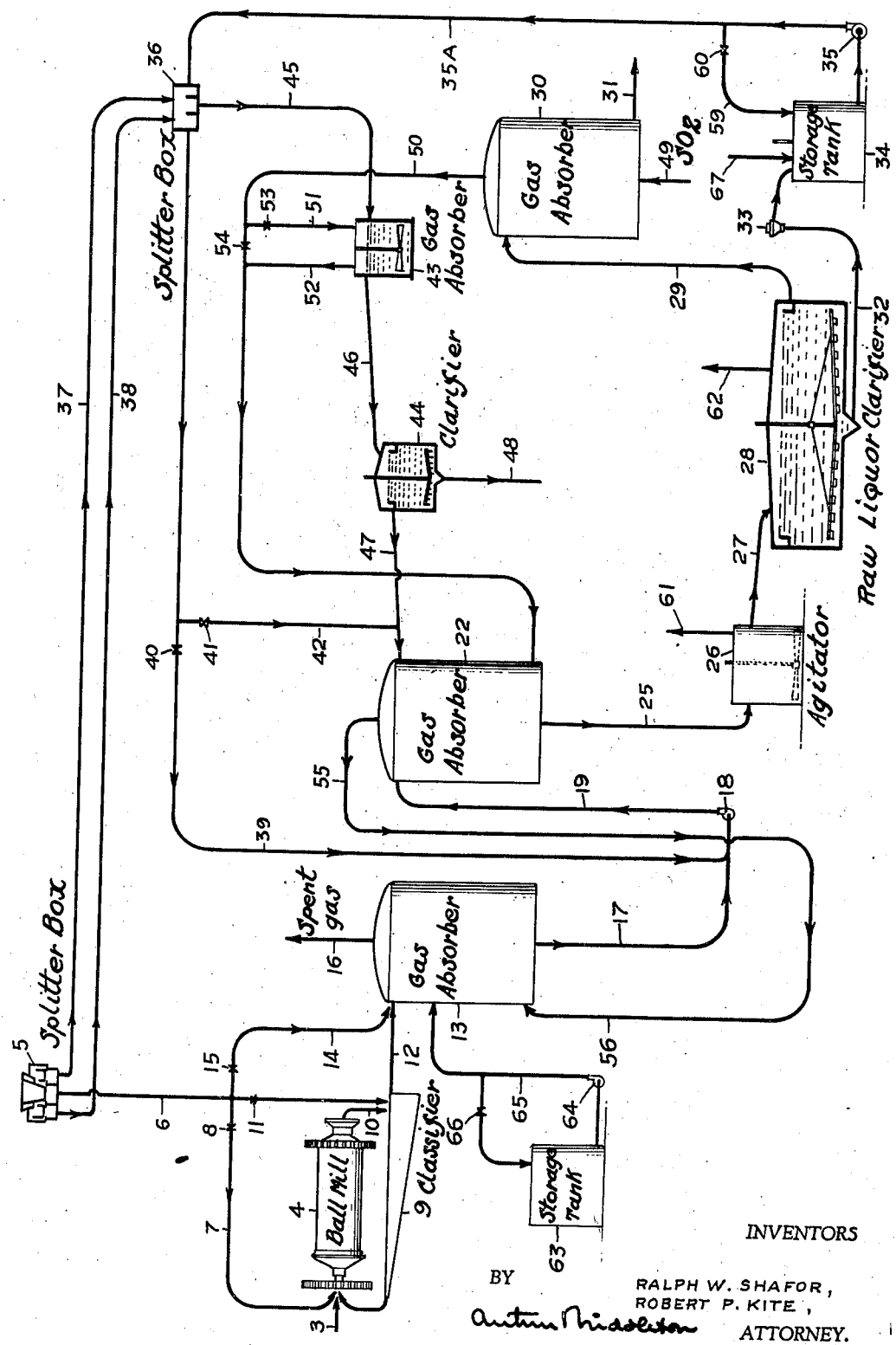

2,190,612

UNITED STATES PATENT OFFICE 2,190,612

PRODUCTION OF BISULPHITE LIQUOR

Ralph W. Shafor, New York, and Robert P. Kite, Yonkers, N. Y., assignors to The Dorr Company, Inc., New York, N. Y., a corporation of Delaware Application June 1, 1936, Serial No. 82,772
In Canada January 30, 1936

1 Claim. (Cl. 23—130)

This invention relates to methods for producing bisulphite liquor, such as is used as a cooking liquor in the digestion of wood and other materials to yield a cellulose pulp.

More particularly, it pertains to certain improvements, especially applicable in connection with the process of making bisulphite liquor as set forth in United States application for patent Serial No. 515,266, by Miller and Darby, issued June 2, 1936, as Patent No. 2,042,777, and further, in United States application for patent Serial No. 758,580, by Miller, Shafor and Darby, issued June 2, 1936, as Patent No. 2,042,478.

One object of this invention is to provide for rejecting inert unreactable solid-phase material from a system in which the above or other methods of producing bisulphite liquor are being practiced.

A further object is to provide methods for rejecting inert unreactable solid-phase material from the intermediate reaction product slurry.

A still further object of the invention is to provide primary basic materials and also intermediate basic materials which can be utilized in the above-mentioned processes.

Referring first to the preferred method and other methods of rejecting inert solid-phase material, we will review the process for production of bisulphite liquor as set forth in the applications mentioned above, for the purpose of showing the inter-connection of the inert solid-phase rejection operation with the primary process and its importance and advantages.

The process proposes to employ limestone, dolomite or $CaCO_3$ in fine-particle form and/or solid-phase intermediate reaction product (such as calcium mono-sulphite ($CaSO_3$)) in water suspension and in an amount exceeding that which will be dissolved with a single passage through the reaction zone or zones in which it is contacted with sulphur dioxide ($SO_2$) containing gases. Consequently, a reaction product is drawn from the bottom of the reaction zone, which consists of a slurry, the solution phase of which contains both bound and unbound $SO_2$ and the solid phase of which contains essentially the intermediate reaction product with possibly some unreacted primary basic material and also some inert solid-phase inorganic material. The latter is necessarily introduced with the basic material employed in the production of bisulphite liquor regardless of whether the basic material is of a primary or intermediate nature.

A preferred method of carrying out the process is designated on the drawing in diagrammatic manner. Referring to the attached drawing, we will illustrate the process, in preferred manner, by showing the adaptability of one primary basic material to the process, namely, limestone.

Limestone crushed to approximately $\frac{1}{8}''$, in some conventional manner, is delivered from the source 3 in convenient quantities to a pebble mill 4 with a suitable quantity of water obtained from the water supply 5 via the piping 6 and 7, and the valve 8. The ground limestone slurry leaving the pebble mill flows at 10 to a classifier 9 (such as the Dorr) with a suitable further addition of water through the line 6 and valve 11, to permit classification and separation of the limestone. A size separation of the limestone, preferably at from 100 mesh to 325 mesh, is herein made, although separations at other sizes may be made. Oversize limestone is returned from the classifier to the pebble mill, by closed circuit operation, for further reduction to the particle size required.

The slurry, usually designated as classifier overflow, and containing limestone in fine-particle form, is introduced along the path 12 to an absorption tower 13, together with a pre-determined quantity of water delivered through pipe 14 and valve 15. We also contemplate the addition of water to other points in the process than that indicated by pipe 6. The absorption tower 13 may be of any conventional type suitable for absorption of sulphur-dioxide gas in water and its reaction with the primary basic material, which in this instance is limestone. A ring tile packed tower is designated, but other types can be used. Sulphur-dioxide-bearing gas of relatively low $SO_2$ concentration enters the tower through conduit 56 and passes upward in intimate contact with the basic slurry. By absorption and subsequent reaction with the slurry, the gas is substantially, if not entirely, stripped of its $SO_2$ content, and is discharged from the system as tail gas through conduit 16.

Slurry discharged from tower 13 through pipe 17 is normally basic, but may contain sulphur dioxide in liquid phase as well as in solid phase. The solid-phase portion of the slurry would, in this instance, be a mixture of primary basic material, calcium mono-sulphite and inert material.

Slurry from tower 13 containing solid-phase material in excess of that which will dissolve through reaction with the amount of $SO_2$ present, inert material, and solution-phase containing both combined and free $SO_2$, is removed from the tower through pipe 17 and transferred by means of pump 18 and piping 19 to the top of tower 22. This tower is of similar size and construction to tower 13 and the two towers are interchangeable for the proper operation of the process. The interconnecting piping, valves and conduits are not indicated on the drawing in order to simplify the sketch, but the interconnecting items are simple and well known in the industry. In addition to the slurry from tower 13, there is normally introduced to tower 22 as liquid phase a solution containing free and combined $SO_2$ from clarifier 44, the source of said solution being disclosed later in the specification. The solution from clarifier 44 may be introduced at other steps in the process, but we show merely a preferred arrangement.

Tower 22 constitutes a portion of the reaction zone wherein the slurry, containing solid-phase material in excess of that which will dissolve through reaction with the $SO_2$, is intimately contacted with $SO_2$ gas delivered through conduit 50. The source of the $SO_2$ gas may be any known in the industry.

The function of equilibrator 26 is brought out in the application for patent Serial No. 758,580 by Miller, Shafor and Darby, issued June 2, 1936, as Patent No. 2,042,478. Slurry from tower 22 is introduced through pipe 25 and discharged through pipe 27 to the raw bisulphite liquor clarifier 28. A conduit 61 may be provided for venting any $SO_2$ gas to a proper point of re-use.

The raw liquor clarifier 28 separates the slurry delivered to it through pipe 27 into two components, first, a substantially clear solution known generally as raw bisulphite liquor and containing predetermined amounts of both combined and free $SO_2$. This liquor leaves the clarifier through pipe 29 and may then be handled and treated by a number of methods, all of which are well known in the industry, to produce finally finished bisulphite liquor. In the present instance, the clarified liquor is shown to be conducted to a finishing tower 30 where it is preferably contacted with strong $SO_2$ gas derived from any suitable source and introduced to the tower at 49. In the tower the liquor is fortified with gas to any desired extent and discharged therefrom at the point 31 as finished bisulphite liquor. The second component is discharged through pipe 32 by means of pump 33 and comprises a sludge containing in liquid phase, raw bisulphite liquor and in solid phase, the excess of solid-phase material which did not dissolve through reaction with $SO_2$ in its previous passage or passages through the reaction zone. A conduit 62 may be provided for venting any $SO_2$ gas to a proper point for re-use.

Pump 33 delivers slurry to a storage tank 34, from which it is removed in predetermined quantity by pump 35. A circulation and control feature is added by valve 60 and pipe 59.

We now describe one of the primary objects of the invention, that is, a preferred method of rejecting inert solid-phase material from the intermediate reaction-product slurry, and the control thereof. Pipe 35A discharges into a splitter box 36, wherein the sludge is divided into two or more streams, each of which contains a predetermined quantity of solid-phase material. The proportioning or dividing of the total sludge flow from pipe 35A, will be controlled by adjustment in the splitter box, so that the inert solid-phase material leaving the splitter box by means of pipe 45 will be approximately equal in quantity to that introduced to the bisulphite liquor system as a whole, regardless of whether it is introduced as inert material in a basic raw material of primary character or as inert material in a basic raw material of intermediate character. Slurry containing solid-phase material leaving the splitter box by pipe 39 constitutes the intermediate reaction-product slurry, which is returned to the reaction zone in accordance with the Miller-Darby application previously referred to, and reintroduced via the valve 40 into the reaction zone ahead of the tower 22 or via the valve 41 and piping 42 into the absorption tower 22. In the splitter box 36 the slurry may be diluted by the addition of water from the water supply 5 through the piping 37 and 38.

The sludge entering pipe 45 is diluted with a predetermined quantity of water for the purpose of providing sufficient water to contain in a solution phase all of the solid-phase material which is dissolved in the subsequent operation. Further, the quantity of water will be such that the total (combined and free) $SO_2$ content of the solution leaving the next step preferably will not exceed and more preferably will be less than that of the raw bisulphite liquor being produced at the same time.

Slurry delivered by pipe 45 enters a gas absorber 43 of the Turbo and other type, wherein the slurry is intimately contacted with preferably an excess of $SO_2$ gas, delivered from the finishing tower 30 through the conduit 50, and introduced to the absorber 43 through the piping 51, the amount being controlled by manipulation of valves 53 and 54. Excess $SO_2$ gas may be returned from the gas absorber through the piping 52 to the conduit from which it originated. The solution leaving the gas absorber by pipe 46 will contain, in the solution phase thereof, substantially all of the reactive material from the slurry fed thereto, together with combined and free $SO_2$, and in the solid phase thereof, inert material and substantially none of the reactive basic material employed for producing raw bisulphite liquor. Said solution enters a clarifier 44, whereby sedimentation and clarification, there is produced, first, a substantially clear solution containing dissolved reactive basic material and free and combined $SO_2$ and, second, a sludge product discharged through pipe 48 and containing a liquid phase similar to that just described, and solid phase inert material substantially free from reactive basic material.

The substantially clear solution may be returned to the main process at any of several points and we have indicated a pipe 47 leading to the absorption tower 22. The sludge product may be discarded as such, although in some instances it may be advisable to recover and re-use the liquid phase of some conventional manner, such as sand filtration followed by water washing.

We have just described a preferred continuous method of rejecting solid-phase inert material. The process may also be similarly conducted on the batch principle, while the main operation of producing bisulphite liquor is conducted continuously.

Another form would consist of stopping the flow of input basic material and circulating the intermediate reaction product through the reaction zone in contact with $SO_2$ and water until substantially all reactive basic material is converted to liquid phase. The inert material will have collected in the raw-liquor clarifier 28 and can be removed and discarded following which the process will resume in routine manner.

Still another form would be to so treat the slurry discharged through pipe 45 that it was amenable to flotation and separation of the basic reactive material and inert material so that the former could be re-used in the process and the latter discarded, or the slurry discharged through pipe 45 could be treated or subjected to any known separation operation other than flotation, which will be effective to separate the inert material from the reactive material so that the former could be rejected from the system and the latter returned for re-use.

Another form would include treatment of the basic raw material, prior to its use in the process, so that it would be amenable to flotation and separation of the basic material and inert material by well-known methods, so that the former would substantially entirely be converted to liquid phase by the process and the latter discarded.

The elimination of the inert material in quantity equivalent to that introduced to the process as a whole, and without appreciable loss of bisulphite-liquor producing material, is of material importance in the operation of the bisulphite liquor process. In the existing processes, this inert material accumulates in the absorption towers and its removal requires stopping the process and manually cleaning out or flushing out the inert accumulation with consequent loss of both liquid and solid-phase bisulphite liquor constituents. Also, in the existing processes, a portion of the inert material is discharged from the process suspended in the bisulphite liquor, requiring sedimentation or filtration, of all the bisulphite liquor in order to prevent the inert material being delivered to the digester with the cooking liquor and thus contaminating the sulphite pulp.

Referring now to the stated objective concerning the raw materials which can be used in the process in its broader aspects, it will be noted that well-known primary basic materials are naturally suitable. We have previously shown that the natural basic carbonates, such as limestones and dolomites, as well as calcium carbonate, are suitable raw basic materials for the production of raw bisulphite liquor by this process.

Another class of suitable primary basic materials is the basic hydroxides, usually referred to as milk of lime and milk of dolomite. These hydroxide raw materials can be prepared for the process by conventional methods from calcium oxide, magnesium oxide or both, and water. A preferred point of application and method of handling is indicated on the drawing where a supply of primary basic material in slurry form is maintained in a storage tank 63 and transferred from the storage tank to the absorption tower 13 in predetermined quantity by pump 64 and through pipe 65. Valve 66 indicates a further means of control. The primary basic raw material may also be introduced at other points in the process.

Another form of raw material entirely suitable for the process is the basic material which we define as being of intermediate character, merely to distinguish it from those of a primary character, such as the basic carbonates and basic hydroxides to which we have previously referred. More specifically, these basic raw materials of intermediate character are the basic monosulphites, suitable for production of bisulphite liquor, such as calcium and magnesium monosulphites, or both.

Normally, the calcium base would be in solid phase and the magnesium base in liquid phase, however, either base material is suitable for the process in either solid or liquid phase. A preferred point of introduction of such material is shown on the drawing entering storage tank 34 as indicated at 67, although it may be introduced at other suitable point or points.

Similarly, the bisulphite-liquor production may be made from any combination of the basic raw materials, that is, basic materials of an intermediate character may be used to supply the base for a portion of the bisulphite liquor produced and basic materials of a primary character used in quantity required to supply the base for the remaining portion of the bisulphite liquor production.

While herein has been shown and described a system comprising a specific arrangement and kind of apparatus elements, and a specific example of a method of producing a desired product, it is to be understood that the invention is not limited to such specific system and method, but contemplates all such variants thereof as fairly fall within the scope of the appended claim.

Wherever the term limestone or natural limestone rock is employed in the claim, the same is to be broadly construed as comprehending any and all forms of limestone or limestone rock, regardless of whether it is pure limestone such as calcite or whether it is known as dolomite limestone or magnesite which, as above pointed out, contain calcium and magnesium carbonates in various proportions.

We claim:

In a process of manufacturing bisulphite acid liquor, the steps of passing through a reaction zone in counter-current to a flow of $SO_2$-bearing gas a slurry comprising finely-divided limestone rock, water and reaction products from a previous cycle of the operation, said slurry containing reactive solid phase material in excess of that which will dissolve through reaction with the $SO_2$, withdrawing from said zone a reaction-product slurry containing solids which will not react through contact with the $SO_2$ as well as reactive solids, treating said reaction-product slurry to separate therefrom a raw bisulphite acid liquor, returning a quantity of the remainder of said slurry to said reaction zone, treating another quantity of the remainder of said slurry with $SO_2$-bearing gas to dissolve a substantial amount of the reactive solids contained therein, separating a substantially clear solution from said treated quantity and returning the same to said reaction zone, and rejecting from the process the other portion comprising substantially unreactive solids resulting from said last named separation step.

RALPH W. SHAFOR.
ROBERT P. KITE.